(12) United States Patent
Bornemann et al.

(10) Patent No.: US 11,366,449 B2
(45) Date of Patent: Jun. 21, 2022

(54) MACHINE TOOL WITH CONTROL DEVICE

(71) Applicant: DECKEL MAHO Pfronten GmbH, Pfronten (DE)

(72) Inventors: Armin Bornemann, Marktoberdorf (DE); Daniel Fohler, Marktoberdorf (DE); Rudolf Füssinger, Pfronten (DE); Manfred Schmid, Seeg (DE)

(73) Assignee: DECKEL MAHO Pfronten GmbH, Pfronten (DE)

( * ) Notice: Subject to any disclaimer, the term of this patent is extended or adjusted under 35 U.S.C. 154(b) by 0 days.

(21) Appl. No.: 15/734,216

(22) PCT Filed: Jun. 28, 2019

(86) PCT No.: PCT/EP2019/067349
§ 371 (c)(1),
(2) Date: Dec. 1, 2020

(87) PCT Pub. No.: WO2020/002610
PCT Pub. Date: Jan. 2, 2020

(65) Prior Publication Data
US 2021/0208564 A1 Jul. 8, 2021

(30) Foreign Application Priority Data
Jun. 28, 2018 (DE) .................... 10 2018 210 625.8

(51) Int. Cl.
*G05B 19/406* (2006.01)
*G05B 19/409* (2006.01)

(52) U.S. Cl.
CPC ......... *G05B 19/406* (2013.01); *G05B 19/409* (2013.01); *G05B 2219/36542* (2013.01)

(58) Field of Classification Search
CPC ............... G05B 19/406; G05B 19/409; G05B 2219/36542; G05B 2219/34456
See application file for complete search history.

(56) References Cited

U.S. PATENT DOCUMENTS

| | | | |
|---|---|---|---|
| 2007/0113199 A1* | 5/2007 | Lausterer | G05B 19/106 715/810 |
| 2011/0202166 A1* | 8/2011 | Born | G05B 19/0426 700/159 |
| 2014/0172148 A1* | 6/2014 | Miller | G05B 19/409 700/183 |

FOREIGN PATENT DOCUMENTS

| DE | 10037003 A1 | 2/2002 |
|---|---|---|
| DE | 102009054420 A1 | 10/2010 |

(Continued)

OTHER PUBLICATIONS

International Search Report dated Nov. 8, 2019 for PCT App. Ser. No. PCT/EP2019/067349.

(Continued)

*Primary Examiner* — Christopher E. Everett
(74) *Attorney, Agent, or Firm* — Hendricks Slavin LLP

(57) ABSTRACT

The invention is directed to a machine tool W having a control device for controlling the operating modes of the machine tool W. The control device comprises an operating unit B for operation of the control device by a user and a safety controller S for actuating the various machine areas M of the machine tool W. By means of the operating unit B, it is possible to select machine areas of the machine tool W and to define an operating mode for the selected machine areas M. The selected machine areas M and associated operating mode are transmitted to the safety controller S. As a result of this type of actuation of the machine tool, safe operation is possible during installation and service work on the machine tool.

21 Claims, 11 Drawing Sheets

(56) References Cited

FOREIGN PATENT DOCUMENTS

Figure 1:
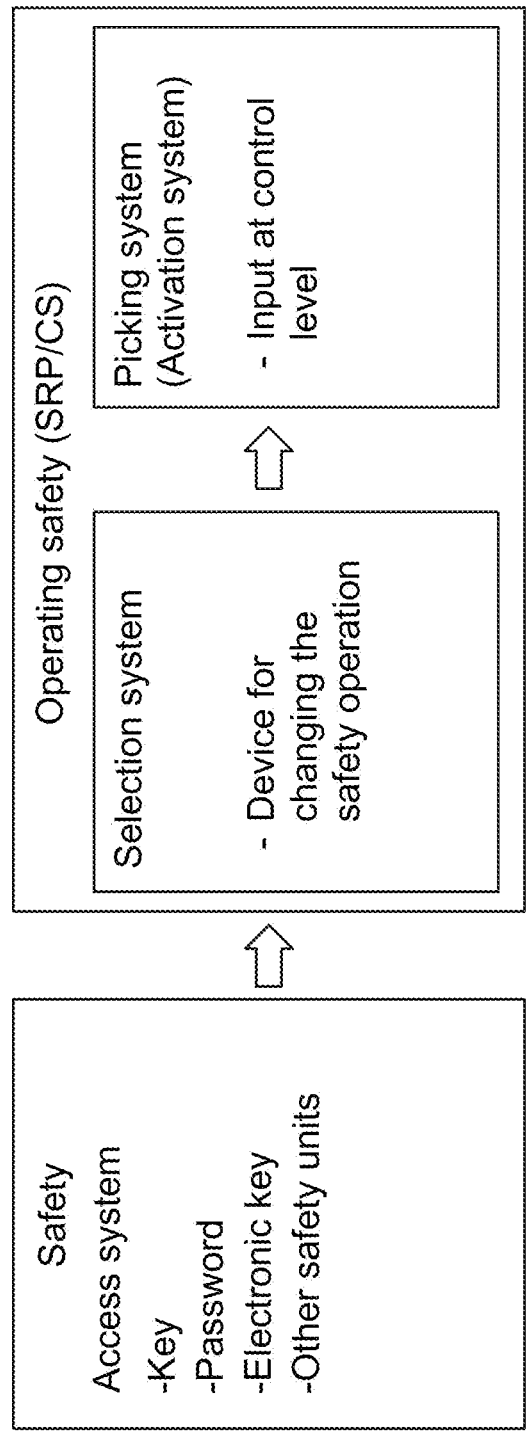

EP 2034378 A2 3/2008
EP 2354870 A2 8/2011

OTHER PUBLICATIONS

Banerjee et al., "Radio Frequency Identification based Manufacturing and Distribution: An Exploratory Overview," Dec. 9, 2006. Retrieved from internet: https://citeseerx.ist.psu.edu/viewdoc/download?doi=10.1.1.106.8378&rep=rep1&type=pdf on Dec. 1, 2020.

* cited by examiner

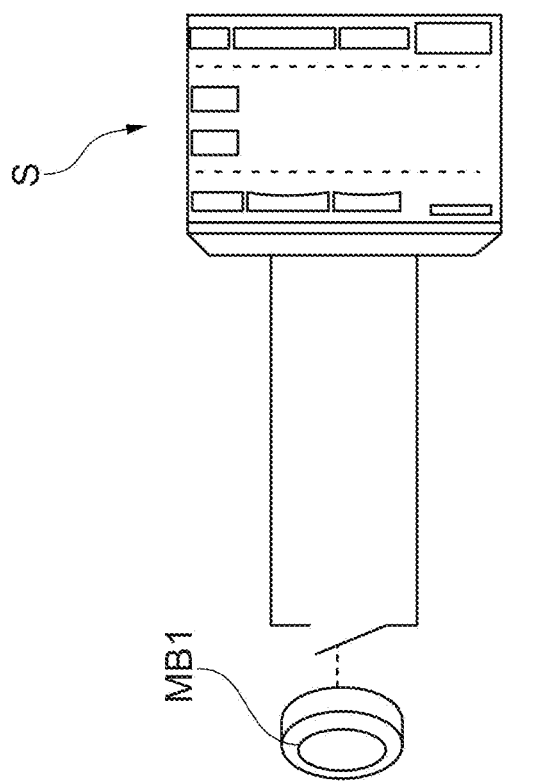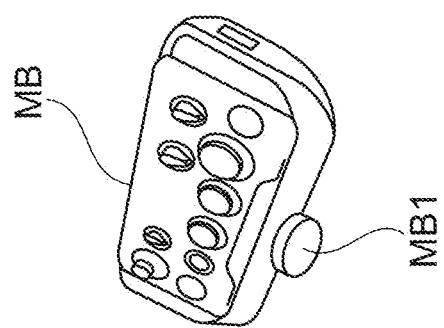
Fig. 3

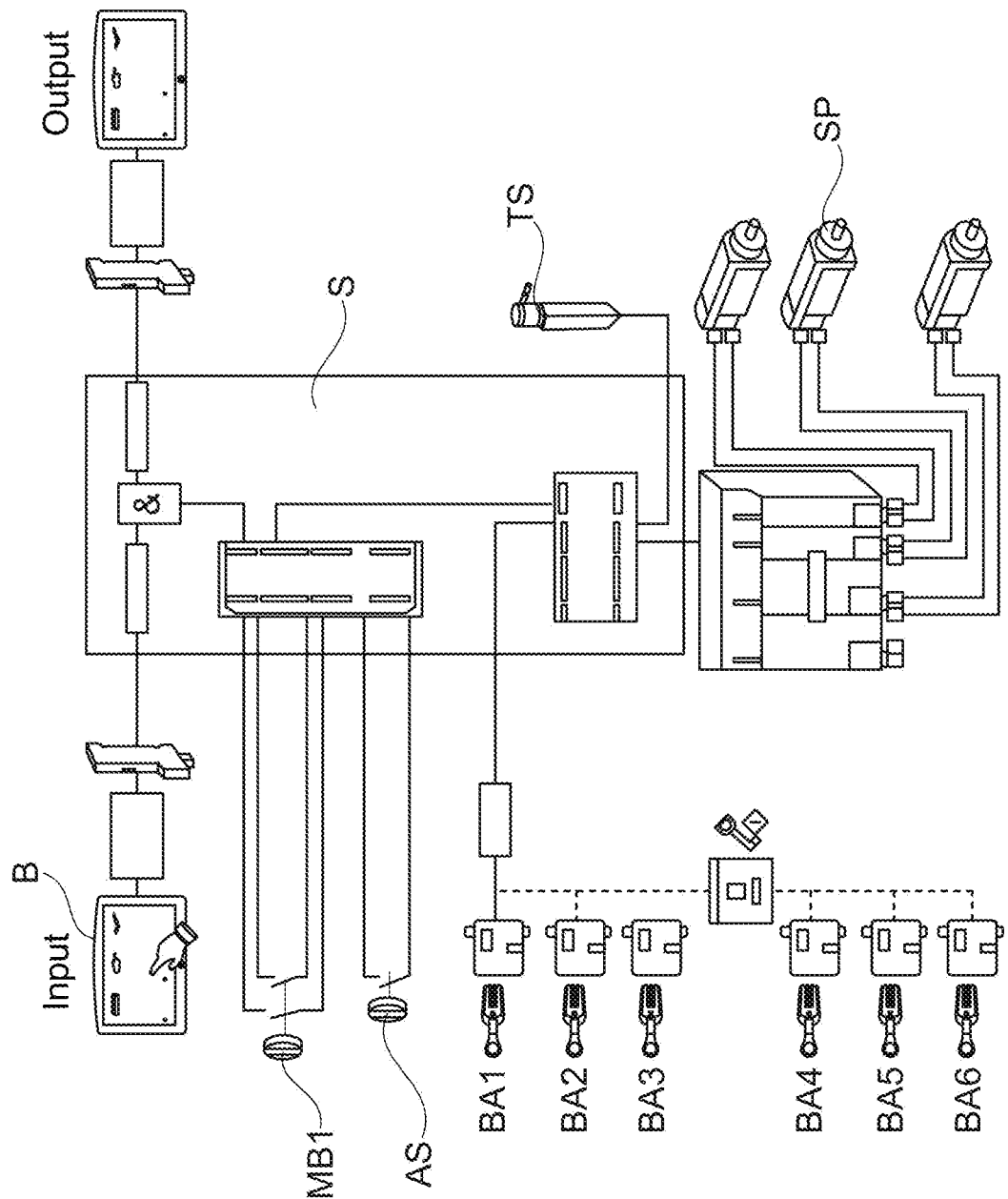

MACHINE TOOL WITH CONTROL DEVICE

The present invention relates to a machine tool with a control device configured to control operating modes of the machine tool.

Access controls for machine tools by means of one or more key switches are known from the prior art. Individual operating modes of the machine in accordance with European directives and standards are specifically activated via these key switches.

A machine tool with an access control device is known from EP 2 034 378 A2, wherein a user can select one or more operating functions via a selection device. An access control device only grants the user access to those operating functions that the user is authorized to perform.

It is an object of the present invention to provide a control device and a machine tool with a control device which has improved operability and control and with which, in particular, safety during operation can be increased in a simple manner.

According to the invention, this object is achieved by the subject matter of the independent claims. Advantageous developments and preferred exemplary embodiments of the invention are specified in the dependent claims.

The machine tool may include a control device for controlling the machine tool and various machine areas. The machine tool may also have different operating modes, in particular also one or more safe operating modes (mode-of-safe-operation, MSO for short), wherein the operating modes may comprise at least one or more standard operating modes and a service mode or a service operating mode. The machine tool can thus be operated in different operating modes, at least in a standard mode and in a service mode. The standard operating modes may, for example, comprise a safe standard operation "Automatic" (MSO 1), a safe standard operation "Setup" (MSO 2), and a standard operation "Extended Setup" (MSO 3). The service operation (MSO SE) may also be configured as a safe operating mode.

The control device can include an operating unit for operation of the control device by a user and a safety controller for actuating various machine areas of the machine tool. Machine areas of the machine tool may be selected via the operating unit and operating modes or safe operating modes may be defined for the selected machine areas, wherein the selected machine areas with the assigned operating modes or safe operating modes may be transmitted to the safety controller.

Advantageously, such a configuration makes it possible to provide a machine tool with a control device wherein the user can select different machine areas of the machine tool via the operating unit and can define specific operating modes for the selected machine areas such that the different machine areas of the machine tool can be operated in different operating modes. This has the advantage of increasing safety, since, for example, only partial areas of the machine tool can be switched to safety operation for service or maintenance work as well as for assembly work, while machine areas that are not required can be put into a sleep mode or a switched-off state, for example.

Operating machine areas in safety mode allows, for example, a very slow movement of an NC axis (e.g., feed axis, spindle, etc.) of the machine tool, wherein error messages when opening service doors, which would normally lead to a safe standstill of the machine, can be suppressed such that the maintenance personnel or the user can perform service work on the machine tool.

At the same time, however, other areas of the machine tool can be operated in a different safety mode, so that a warning or shutdown of the machine tool is in the event of unintentional opening of service doors or in the event of error signals from other machine areas is made possible. By selecting different operating modes or safe operating modes for different machine areas of the machine tool, it is also possible, for example, to carry out assembly work in one machine area and service work (e.g., another assembly or maintenance activity) in another machine area concurrently, wherein the machine areas can be put into the corresponding operating modes or safe operating modes and, as a result, the machine tool can be serviced or converted at a high level of safety and in an efficient manner. When service work is pending, movements in the selected machine areas are safely monitored or stopped and, if necessary, safely made possible using control means.

The operating unit can be configured in such a way that a user is allowed access to functions of the machine tool via an access control unit according to a defined authorization in an access key, the operating unit recognizing the authorization by acquiring the access key. This enables the user to select machine areas according to the user's authorization and to define operating modes according to the user's authorization for the respective machine areas. The authorization of a user may thus be related to machine areas, on the one hand, and on the other hand to operating modes so that a detailed association of the authorizations with a user or the user's access key is possible.

The respective machine areas of the machine tool can be selected independently of one another and individual operating modes or safe operating modes can be defined for each of the selected machine areas. Operating modes or safe operating modes can thus be set independently of one another for the respective machine areas of the machine tool. This allows for the machine tool to be controlled with a high safety factor since, for various work on the machine tool for example, only the machine area for which the respective service or maintenance work and/or assembly work is to be carried out is activated and thus put into working operation, while the other machine areas may, for example, be switched to (or kept in) an off state.

The operating modes may comprise an assembly operation. In assembly operation, the machine tool may be operated during assembly and/or installation of the machine tool. This has the particular advantage that safety-related sensors of the machine area may be partially activated by this assembly operation, with other sensors being deactivated so that, for example when assembling the service door, a speed sensor of the spindle is activated in the respective machine area, so that if the spindle is activated erroneously or unintentionally an error message or an off signal can be output in order to switch off the machine tool or only the respective machine area or to transition it to a safe state.

The control device may allow a selection of machine areas on which assembly work and/or maintenance work is carried out so that these machine areas can be operated in an assembly mode. It is also possible to operate non-selected machine areas in a safety mode or to switch them off.

The control device may include a receiving unit (e.g., in conjunction with a dialing device or selection device and/or activation device for selecting or activating, e.g., a particular operating mode among the available operating modes) for receiving signals from an electronic access key (access unit). Such an electronic access key or access unit may be configured, for example, as a transponder key. The registration and verification of the user who activates the machine tool or the control thereof can be carried out via such an electronic access key. By providing a receiving unit directly on the control device, it is possible to determine the authorizations of the user or the electronic access key used and, based thereon, to enable selectable machine areas and operating modes for selection.

The control may be configured in such a way that the access authorization of the electronic access key is recognized and, depending on the access authorization, a change in the operating modes or safe operating modes and/or access to machine areas can be specified. Thus the control device can be programmed such that access to different operating modes and machine areas can be set in advance for the different authorizations of the different electronic access keys. In a further embodiment, it is also possible to connect the control device to a server via a network so that an administrator can specify the permissible operating modes or permissible safe operating modes and permissible machine areas for the respective authorizations of the access key via the server. This has the advantage that safety can be increased further since, in particular when error occurrences are found in different authorization categories of access keys, it is easy to subsequently change the authorizations such that the errors occurring can be reduced. If, for example, a certain error is produced to an increased extent when using access keys with low authorization, for example by setting the speed of a spindle too high, it is possible to request special authorizations for certain speeds of the spindle so that higher authorization is required for a change in speed beyond a certain range, so that adjustment is only possible with an access key having higher authorization.

The control device may be configured to define an operating mode or safe operating mode of the machine tool for each machine area. This allows for an individual configuration of the operation of the machine tool and thus an increase in safety during maintenance, service and/or assembly work.

Advantageously, the operating modes may comprise at least a manual mode, an automatic mode and an assembly mode (assembly operating mode). In particular, the operating modes can be an automatic mode (operating mode "Automatic", MSO 1), a setup mode (operating mode "Setup", MSO 2) for setting up the machine, and/or an extended setup mode (operating mode "Extended setup", MSO 3) for setting up the machine with extended set-up options and functions, and/or a service mode (operating mode "service", MSO SE), and the above-mentioned assembly mode (assembly operating mode).

Advantageously, the control device may include an enable button for activating the selected machine area in the assigned operating mode. This improves the operation of the machine tool, since erroneous operation without actuation of the enable button is not possible. In addition, it is possible to configure the control device such that the enable button must be pressed continuously to enable operation of the machine area or the entire machine tool. This is possible, for example, when the machine tool is operated manually in order to increase safety when moving spindles at increased speed. By continuously pressing the enable button, it is thus possible to ensure that the user of the machine tool is near the control device and not in a working area of the machine tool or moving away from the machine tool. This is particularly relevant to safety when operating the machine areas in service or assembly mode.

A cabin and/or service door may be provided in the machine area of the machine tool and, in service mode and/or assembly mode of the machine area, the control device may allow the machine area to be operated even though the cabin is open or the service door is open, for example. When the machine tool is operated in service operation or assembly operation, it is thus possible to deactivate safety sensors in a selected machine area in order to enable service or assembly work. For example, when removing the service door in a machine area, the safety sensor for outputting the position of the service door (closed position, open position) can be deactivated for the respective machine area so that the service door can be replaced without problems and without an error message. The other safety elements of the machine area can also remain activated.

The machine tool may, for example, comprise a tool changer, a tool magazine, a pallet changer and/or a chip conveyor system, preferably each assigned to different machine areas.

The control device may operate as an operation selector switch and may be configured to determine the access authorization of a user by determining the user authorization of an access key and to enable the machine tool to be operated in accordance with the authorization of the user.

In a safety mode, the maximum working speed of the machine tool may be reduced and when deviations in the working speed beyond a certain extent and/or a signal from a safety sensor are detected, the machine tool may be stopped (safe stop) by the control device. Here, the safety mode cannot only be selected for the entire machine tool, but also only for special selected machine areas of the machine tool. The reduction of the maximum working speed in safety mode and additionally the detection of deviations in the working speed beyond a certain extent or a signal from a safety sensor also increase safety. The functions of the machine tool may be limited in safety mode.

The machine tool may comprise a control device including a safety mode selection unit comprising a selection system for changing the operating mode, an access system for restricting access to the selection system and a picking system controlling the safety-related parts of the controls. The structure including three systems, namely the selection system, the access system and the picking system, allows increased safety since, for changing the operating mode, first the user's authorizations are checked in the access system and then the operating mode may be changed in the selection system and eventually the control information may be transmitted to the safety controller in the picking system. This can reduce the risk of unauthorized access.

The modes of operation may comprise manual operation, automatic operation and set-up operation, and automatic operation with manual intervention. This allows for a large number of different operating modes for the various machine areas, so that the respective machine areas can be controlled individually.

The service mode may be activated depending on signals from the service door and simultaneous presence of the user's authorization. This configuration makes it possible to put a machine area of the machine tool into service mode as soon as a service door is opened, for example, provided that the user is also authorized for the service mode for the respective machine area. When, on the other hand, the service door is opened by a user who does not have the necessary authorization, the machine tool may be turned off and a warning issued.

The operating unit may comprise a screen for graphically displaying the machine areas and the operating modes of the respective machine areas, wherein the machine areas to be selected may be displayed in a matrix. The graphical representation of the machine areas and the respective operating modes makes it possible to increase safety in that the user can recognize at first glance which machine areas are in which operating mode.

The screen can be a touch-sensitive screen, so that the machine areas and operating modes can be selected directly on the screen. This simple type of operation further increases safety since it is unnecessary to search for the respective switches not arranged on the screen, since switching is possible by directly touching the respective switch on the screen.

Access to the operating unit, via the authorization of an electronic key, may also be protected by entering a password and/or fingerprint (e.g., by fingerprint recognition) or comparable access authorization authentications. The operating unit may thus only be operated depending on the authorization and the respective password and/or fingerprint or the appropriate access authorization.

The operating modes may comprise a service mode for the machine operator and a service mode for the machine manufacturer. This differentiation makes it possible to allow access to particularly critical machine areas or elements of the machine tool only to service employees of the machine manufacturer.

To activate the selected machine areas, an enable button or activation button which must be pressed may be provided. The enable button (activation button) may act directly on the safety controller, with the selected machine area being conveyed to the safety controller via data transmission. This advantageous configuration makes it possible to configure the enable button for operating the machine area independently of the system of the operating unit, so that an independent safety switch-off via the enable button is possible when an error occurs in the operating unit. In other words, when an error occurs in the operating unit, operation of the machine area is prevented by the fact that the enable button is connected to the safety controller independently of the operating unit so that the machine tool is not operated in the preselected operating mode without actuating the enable button.

In order to activate the operation of the machine areas in the respective operating mode, the enable switch must be pressed and the electronic key must also be connected to the control device. This is a further increase in safety, as, on the one hand, it is ensured that the user presses the enable switch and, in addition, that the user also has the necessary authorization since the connection to the user's electronic key is required.

The electronic key may be assigned an authorization which corresponds to the qualification or training level of the user of the key.

Machine areas may be selected via a screen, and after activation, these may be transitioned to safety mode in accordance with ISO 16090.

In addition, feedback from the safety controller may be transferred to the screen of the operating unit and the activated machine areas may be graphically represented there, this graphical representation including, in particular, highlighting of the activated machine areas. This feedback of the machine areas to the screen of the control device makes it possible to give the user feedback about the operation of the respective machine areas. If a faulty machine area is in operation, although it should not be in operation, it is possible for the user to recognize this directly via display on the screen and to correct the error.

The machine areas operated in safety mode may be displayed graphically on the screen of the operating unit. These machine areas can only be activated when the enable button is pressed and the electronic access key is connected to the control device. Thus, the graphic display on the screen increases safety by requiring the electronic access key to be present and the enable button to be pressed.

It may also be possible to change the selected machine areas after activation of the operation or safe operation. Thus, when operation of the machine tool is started, it is possible to change the machine areas and the operating modes during operation, which in particular leads to more flexible control of the machine tool. During various service work, it is no longer necessary to restart the entire machine tool in order to change the machine areas to be operated, but rather the machine areas can be changed during operation.

The machine tool may be configured such that, in case the connection to the electronic key is interrupted, the operation of the machine areas of the machine tool is blocked so that the machine tool is completely or partially stopped.

The machine tool may have a tool magazine, an access to the tool magazine, a plate changer, an access to the plate changer, a working space and an access to the working space, which may each be assigned to a separate machine area.

The operating unit may be a portable operating unit. This allows the user to go to certain portions of the machine tool, in particular during assembly and service work, and to carry the operating unit with the user. It is possible to operate the machine tool in selected machine areas because the user can carry the portable operating unit, and in particular the activation of the enable button required for operation can be performed on site. In service mode, it is no longer necessary for a user to stand at the stationary operating unit in order to press the enable button so that the second user can perform the service in the machine area. Rather, it is possible here for a service employee to carry out the service work with the portable operating unit directly in the machine area and to press the enable button on the portable operating unit to set or activate the machine area in the respective operating mode. The portable operating unit may comprise a permission unit. The machine tool may comprise a control device comprising two operating units, a (stationary) operating unit permanently connected to the control device, and a portable (mobile) operating unit.

The stationary operating unit and the mobile operating unit are preferably configured in such a way that only one of the operating units is ever active or activated. In particular, the stationary operating unit and the mobile operating unit may be configured such that the activated operating unit must be deactivated before the other operating unit can be activated. It is also possible that the stationary operating unit and the mobile operating unit are configured such that the activated operating unit is automatically deactivated when the other operating unit is activated.

In addition to selecting a machine area, the operating unit may also allow the selection of individual or multiple components or devices (e.g., NC axes or feed axes) of this machine area, so that the components (elements, NC axes, etc.) of the machine area can be set (or controlled) as required, wherein the components may in particular be drivable components (for example actuators, feed axes, axis sleds, drive shafts, etc.) of the machine tool. This further differentiation makes it possible not only to select different machine areas of the machine tool, but also different drivable (or controllable) components of the machine tool, such as spindles or the like. These components may also comprise maintenance or service doors for the machine tool. It is therefore possible, for example, to operate the spindle in a safety mode in one machine area and to deactivate the maintenance door in the same or in a different machine area so that the door sensor does not output a false signal when the service door is opened.

The control device may perform a preset coupling of different components and/or machine areas, so that when a machine area is selected, other machine areas or components are also activated (selected) and the operating mode to be set is also assigned to these parts (or these components are switched to a preset operating mode). In addition, it is possible that the preset coupling of different components of machine areas is carried out such that the components are set as to operate the selected machine area in safety mode. For example, when selecting the safety mode for a first machine area the power supply for a second machine area can be cut off, so that safety can be increased.

For configurably transmitting an ID number of the electronic access key (transponder key) used, the control device can execute a handshake-controlled transmission method. This allows for a particularly safe control of the machine tool. The access system may also be integrated into the selection system. The receiving unit of the control device may be an RFID receiver. A control device for controlling a machine tool may comprise an operating unit for operation of the control device by a user and a safety controller for controlling various machine areas of the machine tool. The operating unit may be used to select machine areas of the machine tool and to set operating modes for the selected machine areas, wherein the selected machine areas with the assigned operating modes may be transmitted to the safety controller.

The operating modes can comprise an assembly mode, so that when the machine tool is installed and/or when the machine tool is put into operation, functions of the machine can be provided without having to manually bypass, for example, safety elements of the machine.

The control device may also include an emergency stop button, in particular arranged at the operating unit.

The electronic control device may comprise a display which is touch-sensitive so that inputs can be made by a user by touching the screen. The control device may comprise an additional portable operating unit.

Selected work areas can be displayed graphically on the screen. The selected work areas may preferably be shown in a safe manner by highlighting (flashing) areas on the screen. The selection of the machine areas and the selection of the operating modes may be carried out via the touch-sensitive screen.

To enable operation of the machine tool and/or a machine area, it may be required to press a confirmation button. Via the operating unit, areas of the machine tool may be selected and operating modes may be set for the selected areas, the selected areas with the operating modes being transmitted to the safety controller. Therefore, data transmission between the safety controller and the operating unit is provided.

A method for controlling a machine tool with a control device comprising a machine controller for controlling the machine tool and a safety controller, the method comprising the steps of: accessing the system of the control device by connecting to the electronic key, selecting the operating mode depending on the authorizations of the electronic key, selecting the machine areas and transmitting the data to the safety controller. The machine tool may be divided into a plurality of machine areas, wherein the machine tool can be operated in different operating modes and the operating modes comprise at least one service mode and one normal mode.

A computer program product with program means stored on a data carrier and configured to be executed on a control device of a machine tool may be provided, wherein a method (as described above) can be executed on the machine tool with this program.

Advantageous configurations and further details of the present invention are described below on the basis of various exemplary embodiments with reference to schematic figures.

Figure 2:
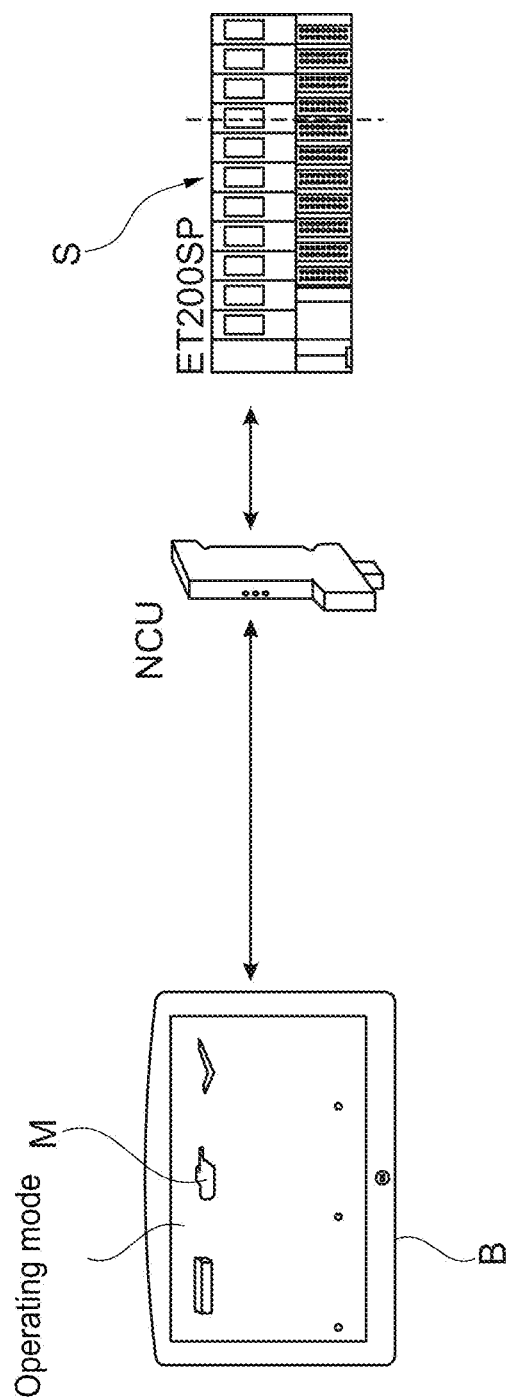
Figure 4:
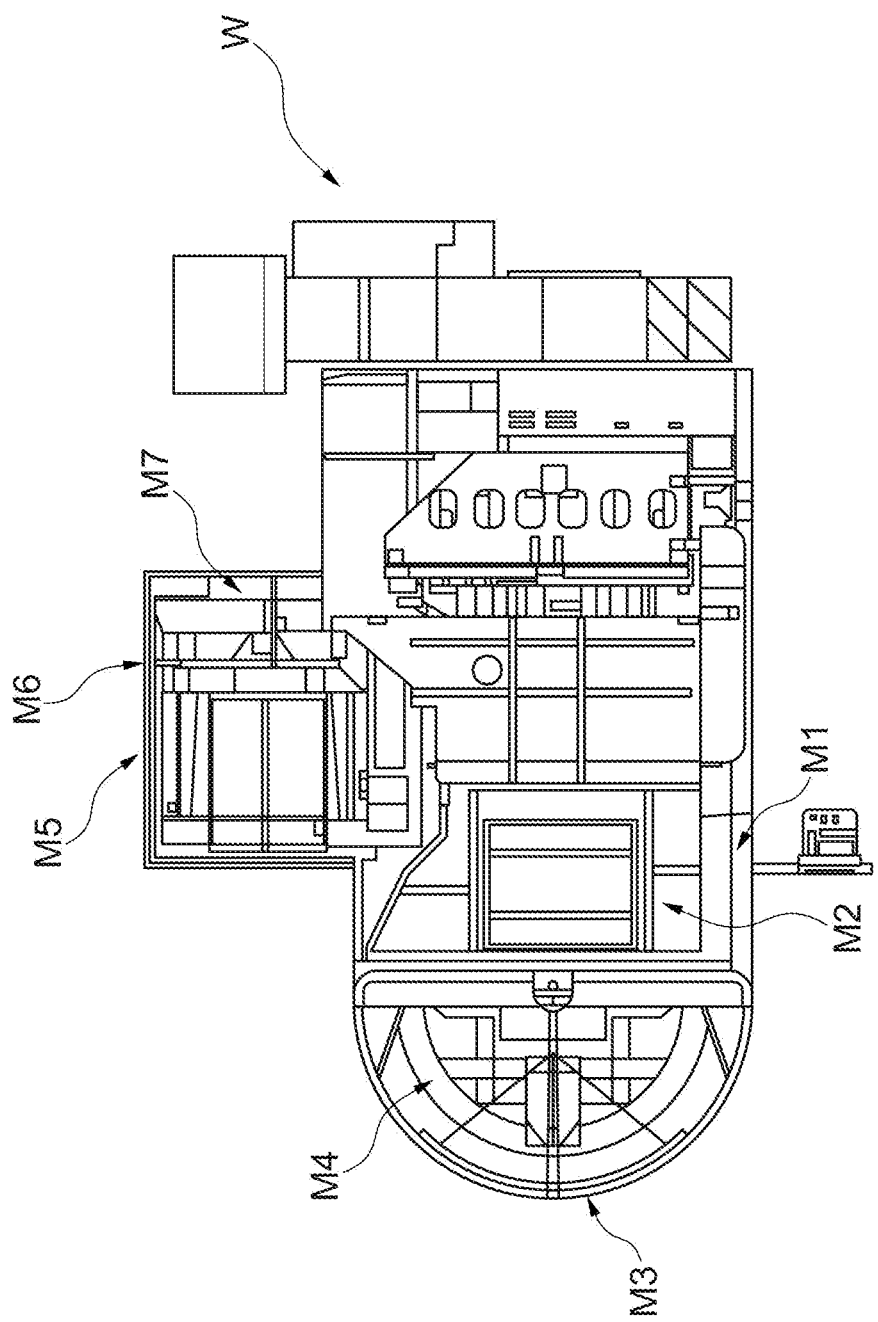
Figure 5:
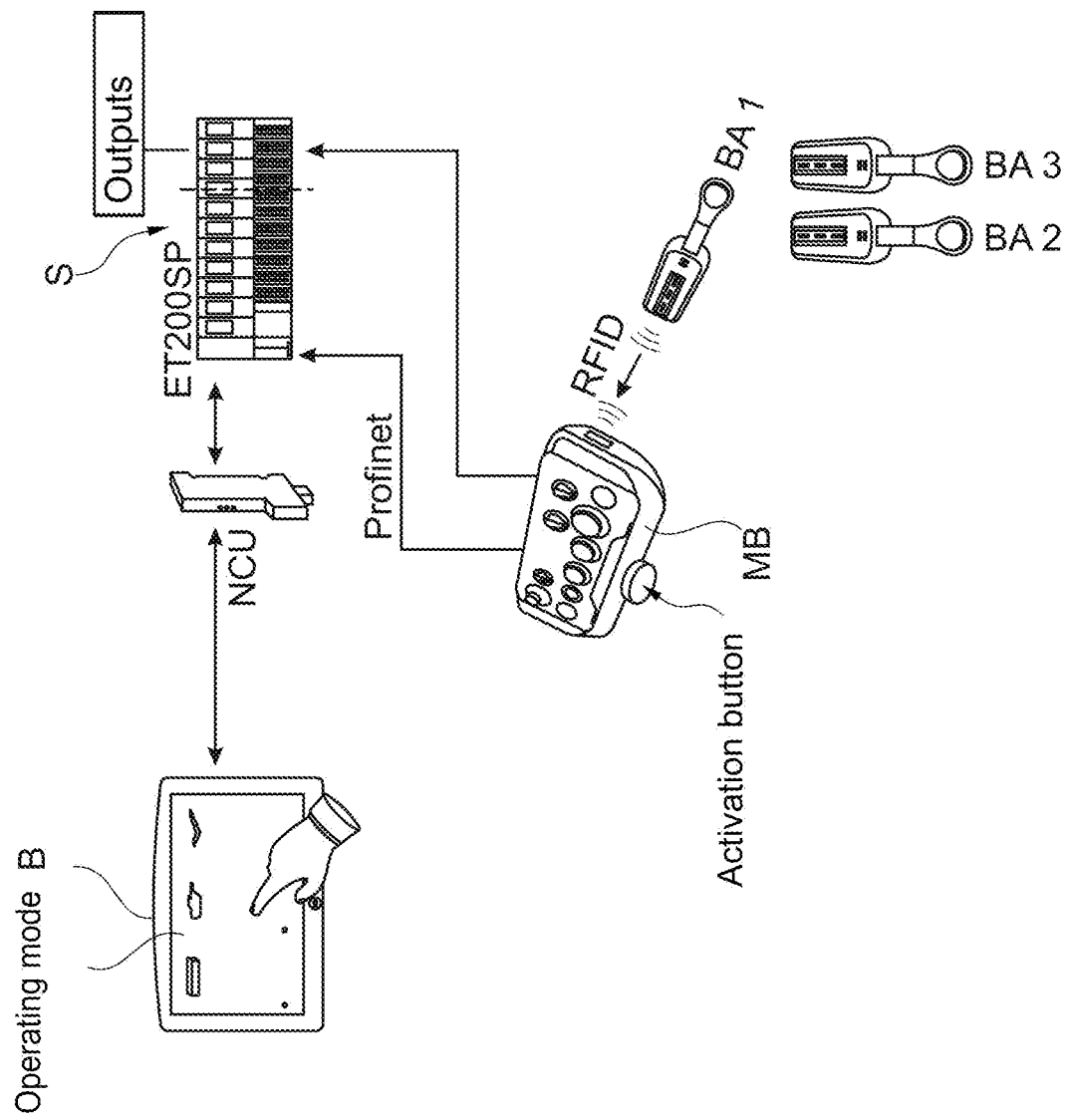
Figure 6B:
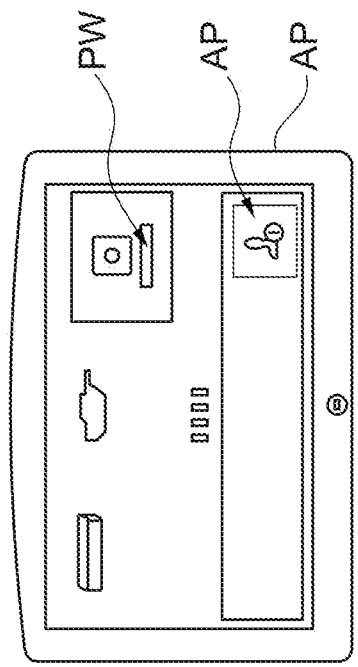
Figure 6A:
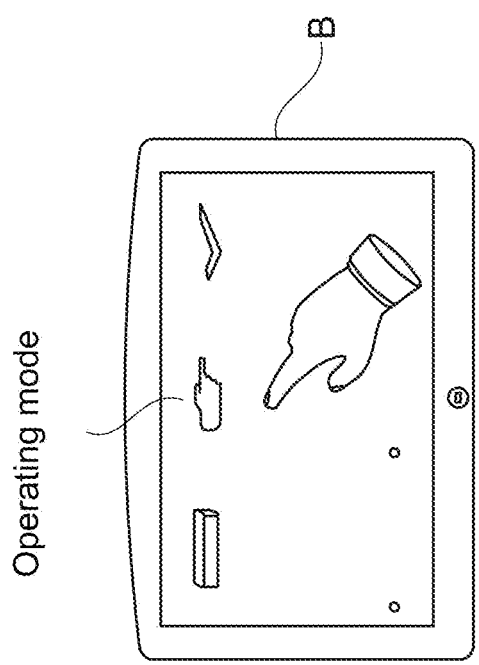
Figure 7:
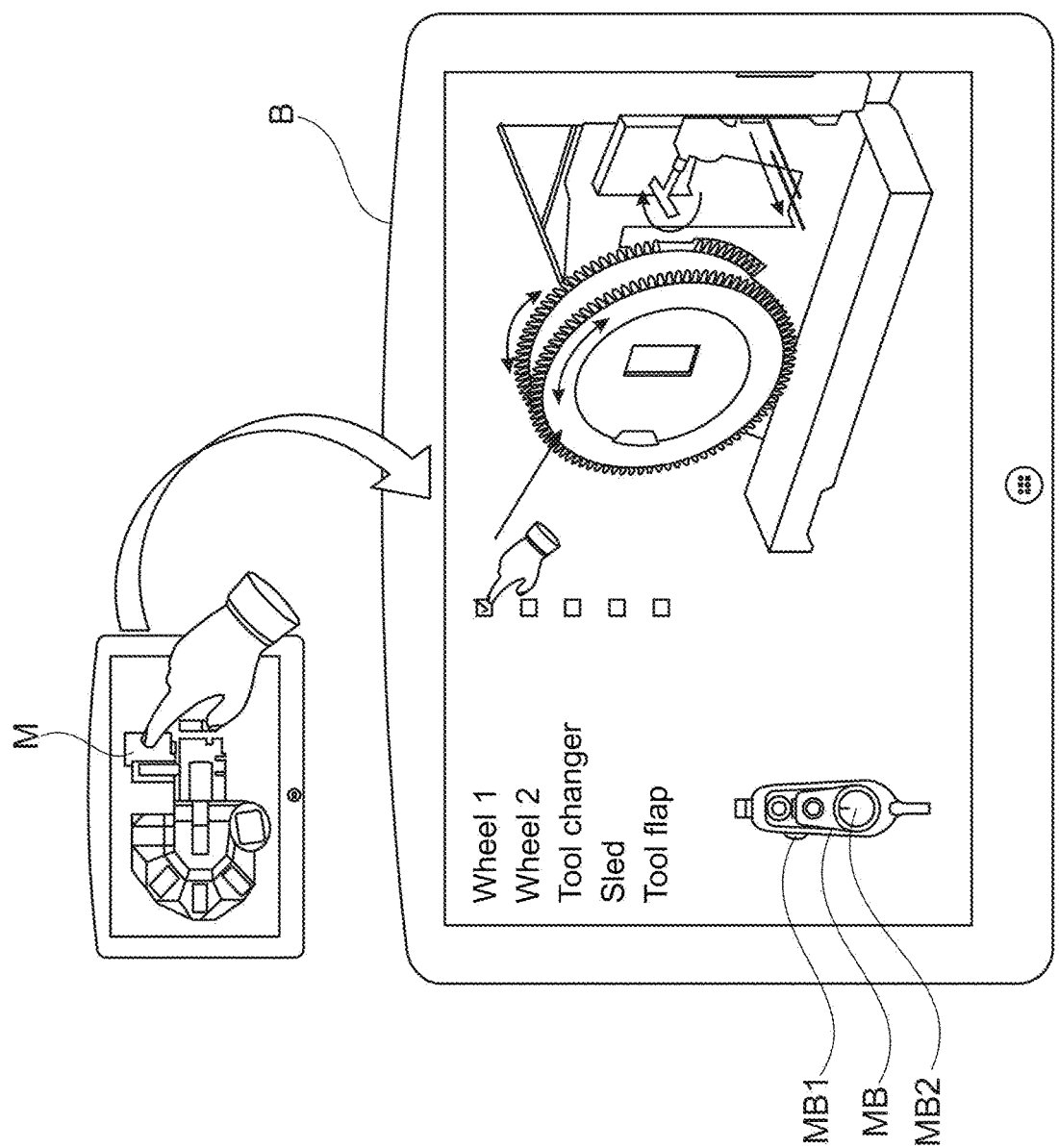
Figure 8:
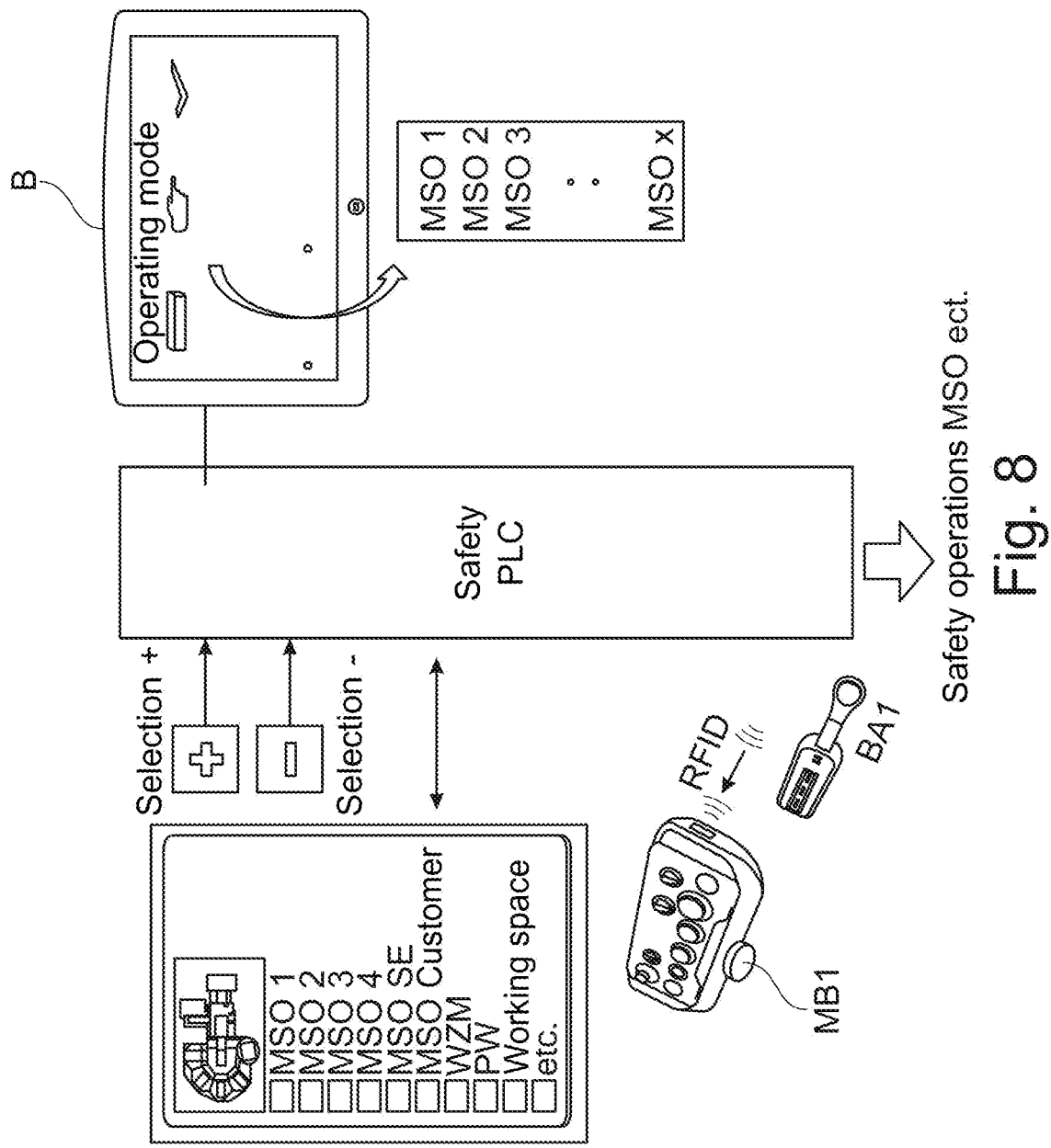
Figure 9:
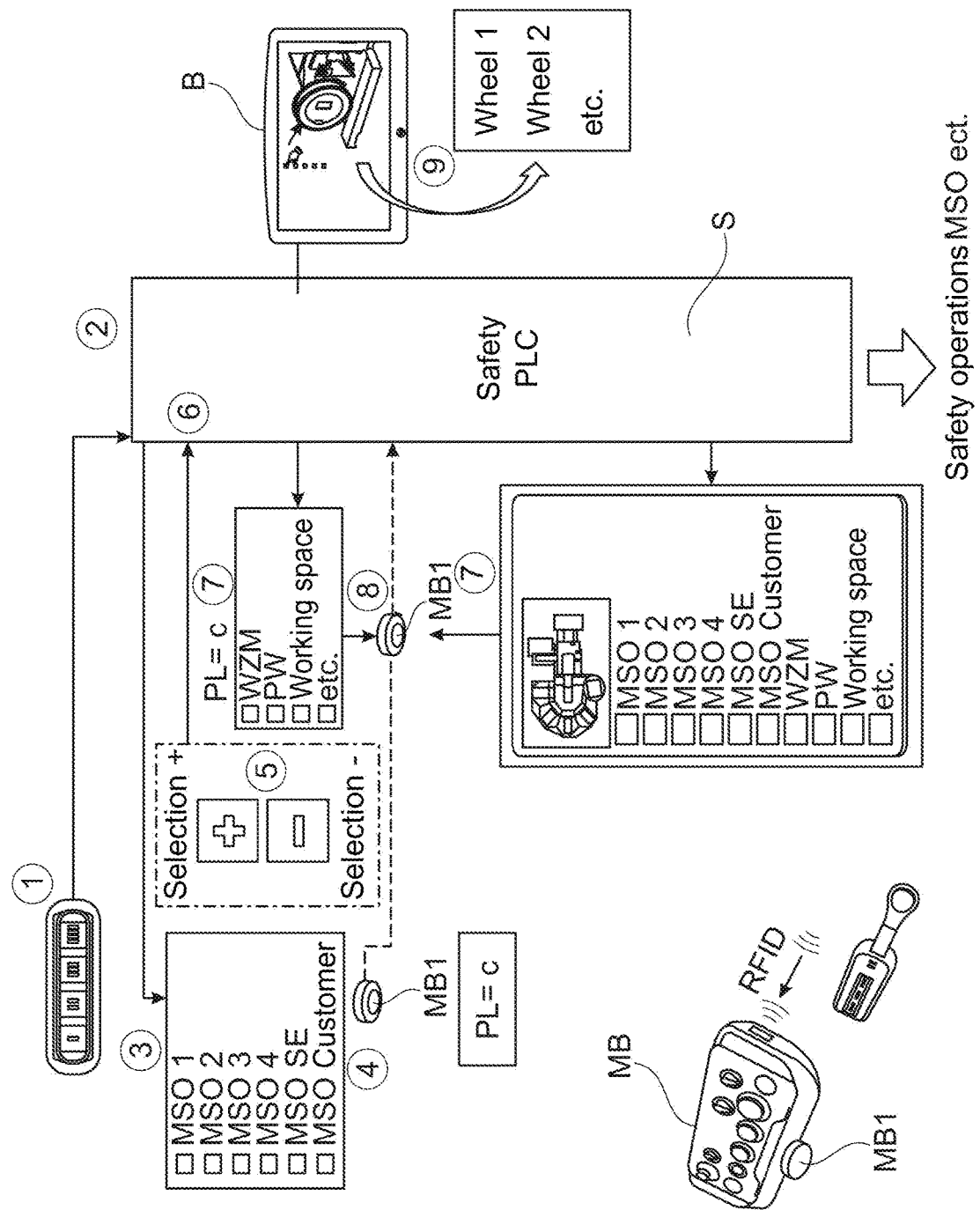
Figure 10:
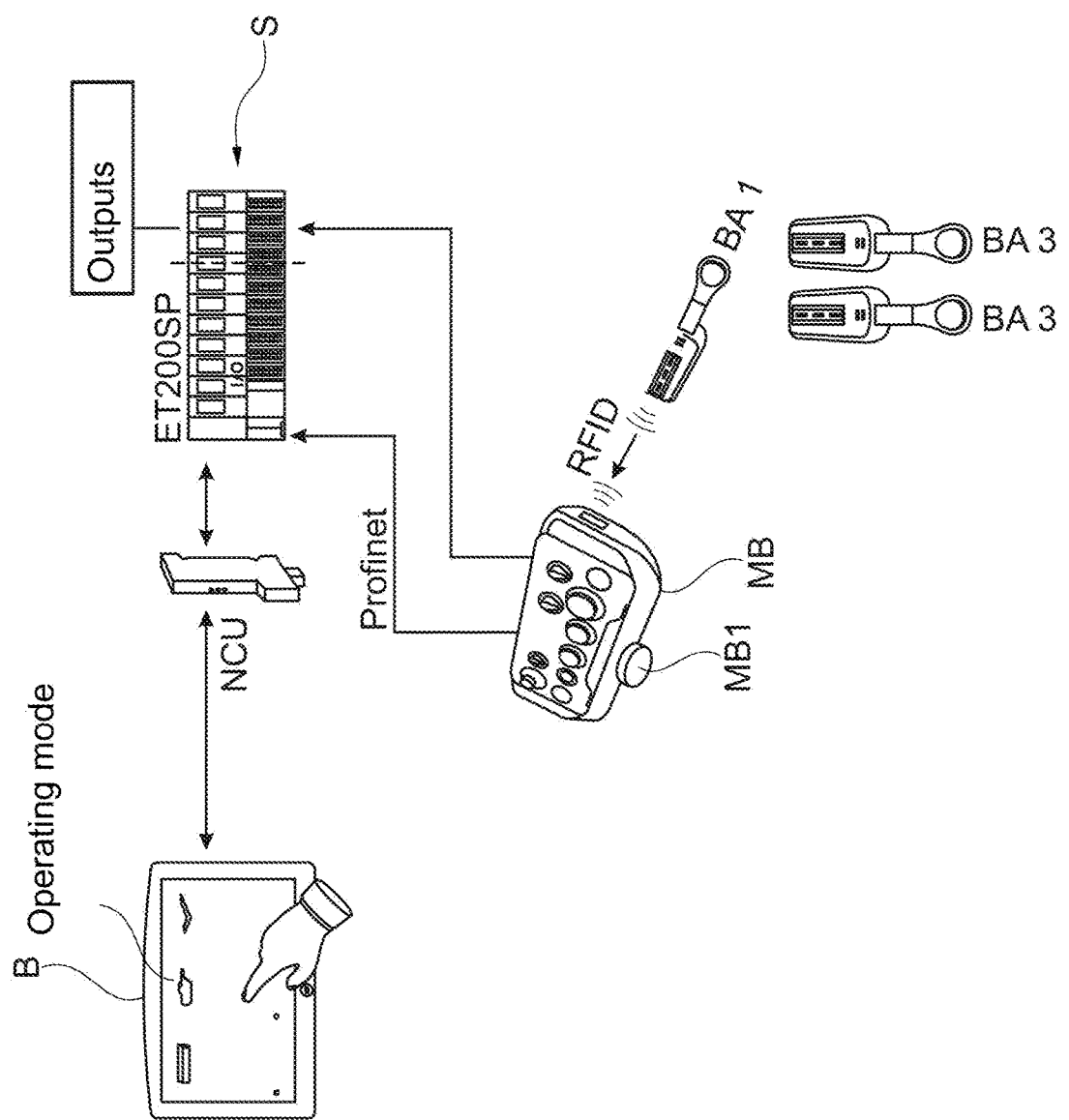

The invention is explained in more detail in the schematic drawings:

FIG. 1: shows an example of the relationship between the access system, the selection system and the picking system;

FIG. 2: shows an example of the operating unit and the data transmission from the operating unit to the safety controller;

FIG. 3: shows an example of a mobile operating unit and an activation button (e.g., safety switch);

FIG. 4: shows an example of a schematic division of a machine tool into machine areas;

FIG. 5: shows an example of the operating unit, a mobile operating unit, the safety controller and various access keys;

FIG. 6*a*: shows an example of the screen of the operating unit for selecting the safe operating modes;

FIG. 6*b*: shows an example of a display of the screen of the operating unit, e.g. for warnings, password entries, etc.;

FIG. 7: shows an example of the selection of a machine area and machine components of the machine area;

FIG. 8: shows an example of a schematic structure of an exemplary embodiment of the control device;

FIG. 9: shows an example of a schematic structure of another example embodiment of the control device;

FIG. 10: shows an example of a structure of the control device with the operating unit as well as the inputs and outputs on the screen of the operating unit; and FIG. 11: shows an example of a schematic structure of another example of a circuit concept.

In the following, various examples of the present invention are described in detail with reference to the figures. Identical or similar elements are denoted by the same reference symbols. However, the present invention is not limited to the features described, but rather encompasses further modifications of features of various examples within the scope of the independent claims.

FIG. 1 shows an example of a safety operating mode selection device consisting of an access system, a selection system and a picking system for manually picking the operating mode of a machine. The access system is a device that restricts access to a restricted group of people and prevents accidental or improper activation of the selection system. The selection system is a device that allows for an operating mode of the machine tool to be changed. The selection system can be integrated into the access system, for example in a key switch (operating mode selector switch), e.g. in connection with a transponder or a similar access system. The picking system is the safety-related part of the entire control system.

The access system, the selection system and the picking system are part of the control device of the machine tool. The control device comprises an operating unit (B) and a safety controller S. The user can gain access to the control system of the machine tool via the access system using the electronic access key (transponder key). Via the selection system, the user is able to select work areas of the machine tool and change the safe operating mode of the areas. After the selection of the operating modes, these instructions are transmitted to the safety controller S of the machine tool W via the picking system on the control level. With this configuration, it is thus possible to restrict access to the control to a certain group of people with the electronic access key in a secure manner and it is also possible to individually select different work areas of the machine tool and to set their operating modes individually. When performing maintenance work or when assembling the machine tool, it is thus possible to carry out the respective work with increased safety.

The machine tool may be operated in a safety mode. The term safety mode comprises an available group of functions with common characteristics that do not exceed a certain level of hazard.

As shown by way of example in FIG. 1, the access system may restrict access in various ways. Access is preferably restricted using an electronic key. Additionally or alternatively, a password may also be requested. Further safety features, such as a fingerprint sensor or the like, may also be provided.

In FIG. 2, a schematic structure of a part of the control device of the machine tool W is shown by way of example. The control device of the machine tool W comprises, for example, the operating unit B including a screen. Via this screen, the user is able, after successfully logging in to the access system, to use the electronic access key depending on the authorization of the user's access key, to select machine areas M on the operating unit B and to set the operating mode for the respective machine areas M. After entering the desired operation of the machine tool W, the recorded data are transmitted via a data connection to the safety controller S, which then controls the corresponding machine areas M according to the information entered.

Particularly, the following exemplary operating modes are possible as operating modes:

Safety operating mode (manual operation, MSO 0): The operation of the machine by means of control "by hand" or by means of manual control specifications without NC functionality. The non-automatic operation of the feed axes is permitted in this operating mode. Here, the operator has control over the machining process without the use of programmed machining steps. The axes of the machine tool can be moved using command units with automatic resetting as well as electronic handwheels or joysticks. This allows for safe and simpler input of the control commands.

Another possible safety operating mode is the automatic mode (standard mode, MSO 1): In the automatic mode of the machine, the machine can be operated without limiting the scope of functions until the program or the operator interrupts or shuts down the machine. The automatic mode may, for example, also include interruptions for changing tools and workpieces.

Another possible safety mode is the automatic mode (standard mode, MSO 1): In the automatic mode of the machine, the machine can be operated without limiting the scope of functions until the program or the operator interrupts or shuts down the machine. The automatic mode can e.g. also include interruptions for changing tools and workpieces.

Another possible operating mode is the setup mode (MSO 2): In setup mode, the operator can prepare for the subsequent work processes, for example determine the position of the tools and workpieces by probing the workpiece with a measuring probe.

Another operating mode is the optional "operation for manual interventions under restricted operating conditions" (MSO 3): This operating mode allows the machine to be operated temporarily under manual or numerical control with limited performance and temporarily open separating protective devices or triggered non-separating protective devices. In this operating mode, a permission unit must be activated to increase safety.

In service operation (MSO SE), it is possible to switch the machine tool to a service mode. Service operation should preferably only be made available to service personnel from the machine manufacturer or to trained and authorized service personnel. The machining of workpieces is not permitted during service operation.

Advantageously, the possible operating modes of the machine tool also include an assembly operation. When the process of putting a machine into operation is begun, for example, the cabin is usually missing. Therefore, assembly work still has to be carried out, for example the attachment of the tool changer, the tool magazine, the plate changer, and/or the chip conveyor system, etc. The cabin is only attached to the machine at a relatively late stage in the assembly. In order to still be able to use the functionalities of the machine tool, it is thus possible to put areas of the machine tool into an assembly mode or to control them as required.

During service operation, it may be possible to work on the machine, wherein, for example, the machine tool cabin has to be removed for certain service activities. Depending on the machine type, the cabin and certain machine assemblies are also detachable for transport and can be transported separately. The service operation thus allows for the machine tool to be controlled for the service work.

The assembly and/or service operation may not only be activated depending on the position of a maintenance door, but also dependencies for activating these operating modes may be provided, such as the presence of an electronic access key with a corresponding authorization.

The machine areas in which work is to be carried out can be selected on the screen of the machine controller via a matrix. The permission for access to the matrix on the screen of the controller is given via an electronic access key (smart key, transponder). The electronic access key carries the authorization for the assembly operation and the service operation.

The preselection of the work area (machine area) is carried out via a matrix on the screen of the operating unit B. The preselected work area is displayed graphically, for example, by flashing or with color, etc. After the input into the operating unit B, a data transmission between the operating unit B and the safety controller S occurs. In particular, this data transmission can be carried out via outputs and/or a bus signal.

The matrix of the preselected machine areas (work areas) is activated via an enable button MB1 (activation button) which acts directly on the safety controller S, as shown by way of example in FIG. 3. Activation is achieved by this process. The safety controller S then reads the machine area M preselected on the matrix and, in case of the transponder with the appropriate authorization being inserted, adopts the preselected machine area M in the safety controller S when the enable button MB1 is pressed. The direct connection between the enable button MB1 and the safety controller is also shown in FIG. 3, FIG. 3 also showing a mobile operating unit MB. The enable button MB1 may be provided both on a mobile operating unit B and on an operating unit B fixedly connected to the machine tool.

The electronic access key carries the authorization for the possible safe operating modes that the respective user of the machine has acquired on the basis of training and his professional qualification.

As a result of the described activation, the preselected machine area M is switched to a mode-of-safe-operation (operating mode: mode-of-safe-operation), e.g. in the sense of ISO 16090-1. Feedback is sent from the safety controller S to the screen of the operating unit B. This feedback is displayed there graphically, for example the flashing preselected machine area M is now highlighted with a static color and safety instructions are displayed. As a result of this process, the machine area M preselected on the screen of the operating unit B is switched to the mode-of-safe-operation, e.g. in the sense of ISO 16090-1, and the safety is ensured by the enable button MB1 and the access key and the visual representation on the screen. Thus, the operator has feedback as to which work area is now defined in the mode-of-safe-operation. Corresponding safety instructions are displayed. If the user would like to change the preselected area, the user can do this by repeating the preceding steps again.

If, for example, the electronic access key for access to the service operating mode is removed, selection from three variants is possible. The selected work area is retained or the selected work area is left and automatic operation is activated or all work areas of the machine are blocked so that hazardous movements are no longer possible.

A possible division of the machine area M (work areas) of the machine tool is shown in FIG. 4. The areas are divided into an area of access to a work space M1 and a work space M2. In addition, an area of the plate changer M4 and the access area to the plate changer M3 (setup station for workpieces) are provided. The area of the tool magazine M6 is adjacent to an area of access to the tool magazine M5 and a second access area to the tool magazine M7. This division into different machine areas of the machine tool W is only one of many possible options for division.

By picking the work area M2 of the machine and putting this area into service mode, it is possible to carry out all work on the NC feed axes and the spindle in the work area. Any necessary laser measurements of tools can also be carried out. In the service mode for the work area M2 of the machine tool W, possibly with coupling of the tool changer (e.g., on machining centers), for example the following functions may be permitted:

NC axes up to a safe maximum feed rate, e.g. maximum 2 m/min;
Spindle with a safe maximum spindle rotation speed, e.g. up to a maximum of 800 revolutions per minute;
no movement of the chip conveyor screws and/or the chip conveyor of the chip conveyor system;
no functionality of the cooling lubricant;
no movement of the pallet changer;
movements of the tool changer;
movements of the tool change flap;

In service mode, a portable permission unit, preferably in accordance with the specifications of ISO 16090-1, may also be provided.

In order to adjust the tool changer and the spindle with respect to one another, the work area M2 and the tool changer may be selected as the machine area. Unrequired NC axes, for example plate changers or chip conveyor screws or conveyors in a chip conveyor system, are safely shut down. During service work, the tool changer flap is open and remains open, for example. The movement of the tool changer must be distinctly preselected on the operating station of the machine, on the operating unit B or on the portable operating station locally plugged in and then moved with a direction key in conjunction with a permission unit. Such a portable operating unit MB is shown by way of example in FIG. 7.

The operator controls the movement on site with the portable operating station MB at a reduced speed, if possible, but always with the permission unit and direction key or the like. In the case of NC axes, the movement may also be produced using a handwheel in conjunction with a permission unit on the portable operating station MB. The selection of the working space and the pallet changer in the service mode allows for the NC axes to be adjusted to one another with the movements of the plate changer. The working space is coupled to the plate changer so that a common selection is possible. All other NC axes in the coupled areas are safely stopped. Other movements, for example the chip conveyor system, etc., are also stopped.

In FIG. 5, the schematic structure of the control of the machine tool is shown by way of example. The operating unit B with the screen, via which the user can select the various areas, is connected to the safety controller S. The safety controller S is also connected to the mobile operating unit MB. Depending on the different electronic access keys (BA1, BA2, BA3 or, e.g., MSO 1, MSO 2, MSO 3, etc.) and the associated authorizations, different machine areas M can be selected.

In FIGS. 6a and 6b, various display options on screens of the operating unit B are shown by way of example. Using the operating unit B, it is possible to select different machine areas of the machine tool and, moreover, preferably also to set operating modes or safe operating modes for the respective machine area M. To activate the machine tool W, it is, for example, possible to request a password via the operating unit B using a password input PW and corresponding software in order to increase security. If the verification is successful, the safety application AP (e.g. including a display of safety instructions) is configured to forward the data to the safety controller S and to control the machine tool W.

The selection of the tool changer and tool magazine is shown by way of example in FIG. 7. An overview of the entire machine tool is given via a first graphic illustration (top in FIG. 7). A single machine area of the machine tool can be selected in this overview. In an advantageous embodiment, it is possible to additionally select the respective components of the selected area individually for the respective machine area of the machine tool (see further graphic illustration below in FIG. 7) and to enable or prevent and prevent their operation in the respective operating mode, that is, for example, to prevent the component from moving. In this way, for example, the tool changer flap and/or a conveyor screw and/or a chip conveyor of a chip conveyor system may be shut down when service work is to be carried out in the work area.

In order to allow for service work on site in the machine area M of the machine tool W, the user can carry the portable operating unit MB including an enable button MB1 and a speed control device MB2, e.g. in the form of a rotary switch (e.g. handwheel). The enable button MB1 ensures that the user always consents to the movement being carried out, with the machine being immediately and safely stopped when the enable button is released. With the rotary switch MB2, it is possible to control the speed and/or the direction of rotation of various components in the selected work area.

It may be necessary that two people are operating, one at the control station and one in the area of the tool changer. Both people communicate with each other. The operator on site controls the movement at reduced speed, if possible, and operates the permission unit and direction button. In the case of NC axes, a handwheel can also be used in conjunction with the permission unit to produce the movement. When using a preferred operating unit, it is possible that the maintenance is carried out by only one person who has all the options for operation in the area of the tool changer via the modified operating unit.

When the tool magazine is picked, it is possible to control all components of the tool magazine individually. In particular, moving parts such as wheels or chains of the tool magazine (e.g. in case of chain or wheel magazines) can be picked individually or in combination on the matrix on the screen of the operating unit, for example. Other movements in this area, such as the tool change itself or tool cleaning, may be safely stopped. The operator can control the movement on site at a reduced speed, with a permission unit and a direction key or the like always being provided. If there is a crushing hazard, the maximum permissible speed is, for example, two meters per minute (circumferential speed). If there is an impact hazard, the maximum speed is, for example, 15 meters per minute (circumferential speed). The selection of the coolant/lubricant system as an additional work area is also possible, wherein all functions of the coolant/lubricant system can be controlled. For this purpose, it is possible, for example, to adjust the nozzles of the coolant/lubricant system in service mode. Axes (e.g., one or more feed axes) and chip conveyor screws or conveyors of a chip conveyor system in other work areas can be safely shut down in order to avoid incorrect operation.

FIG. 8 shows another schematic illustration of the structure of the control device of the machine tool that is possible by way of example. Various operating modes of the machine tool W or the working areas of the machine tool W are shown in the left-hand area. These can be selected individually or in combination, wherein these are forwarded to the safety controller S after the work areas have been successfully selected. The safety controller S generates an output on the screen of the operating unit B on which the activated work areas and operating modes can be displayed. For operation, a connection to an electronic key BA1 and an actuation of the enable button MB1 (activation button) are also necessary.

FIG. 9 also shows another schematic structure of the control device of the machine tool W that is possible by way of example, the enable key MB1 (activation key) for the selection of the various operating modes and the work areas of the machine tool W also being required here. A selection of different areas of the machine tool W in order to put them into service mode is also possible, for example, via the usual switches I to IIII (see reference symbol 1). In addition to this pick, it is also possible to make a pick via the screen using the operating unit B, as already described. The mobile operating unit MB may be provided, wherein it also comprises a receiving unit for communication with an access key. The machine tool W itself is controlled via the safety controller S.

FIG. 10 shows an example of a structure of the control device with the operating unit and the inputs and outputs on the screen of the operating unit, and FIG. 11 shows an example of a schematic structure of another example of a circuit concept.

In FIGS. 10 and 11, the operating unit B is shown schematically by way of example, the operating unit B being connected to the safety controller S, the safety controller S also being connected to the drives of the NC axes and/or the spindle SP of the machine tool W and to the sensors TS, which, for example, sense the opening or closing of a service door. The enable switch MB1 (permission unit) is in direct contact with the safety controller S, a control switch AS (activation button) also directly connected to the safety controller S being provided as well.

Depending on the qualification of the operator and the required activity, the movements on site must be permitted differently. Preferably, a distinction is made between an operator of a machine user and an operator of the machine manufacturer. If the protective devices are closed and locked or the non-separating protective devices are active, then movements are permitted without a permission unit and without reducing the speed. Since the cabin and the doors, and therefore safety switches, are not present during the assembly phase of the machine, there is a separate operating mode. For this period, for example, bypass plugs or comparable devices are used. However, if the respective machine areas are controlled accordingly, these are no longer necessary.

The handshake is a communication protocol for data transfer via a serial interface. With this protocol, the parties involved negotiate the parameters for the data transmission after authentication. The receiver confirms the receipt of data to the transmitter and informs the transmitter that it is ready to receive further data.

The service mode can be activated automatically when the electronic access key is connected and the machine areas M can be selected by the user for operation in service mode.

The present features, components and specific details can be exchanged and/or combined in order to create further embodiments, depending on the intended use. Any modifications within the scope of the knowledge of the person skilled in the art are implicitly disclosed in the present description.

The invention claimed is:

1. A machine tool (W), comprising:
a plurality of machine areas (M), said machine areas (M) each having a plurality of operating modes that include at least a standard mode and a service mode; and
a control device including an operating unit (B) configured to receive user machine area (M) selections and user operation mode selections and a safety controller (S) configured to control said machine areas (M);
wherein said operating unit (B) is configured to assign user selected operating modes to user selected machine areas (M) and to transmit each user selected machine area (M) with said assigned user selected operating mode to said safety controller (S); and
wherein said safety controller (S) is configured to control said user selected machine areas (M) based on said assigned user selected operating modes.

2. The machine tool according to claim 1, wherein operating modes are assignable independently of one another to the respective machine areas (M) of said machine tool (W).

3. The machine tool according to claim 1, wherein said operating modes comprise an assembly mode for operating said machine tool during assembly and/or installation of said machine tool (W).

4. The machine tool according to claim 1, wherein said control device (S) allows for a selection of machine areas (M) on which assembly work and/or maintenance work is carried out and an operation of these machine areas (M) in an assembly mode, wherein operating the machine areas not selected in a safety mode or shutting down these areas is possible.

5. The machine tool according to claim 1, wherein said control device is configured such that an access authorization of an electronic access key can be recognized and, depending on said access authorization, a change in the operating modes, in particular the safe operating modes, and/or access to machine areas (M) is specifiable.

6. The machine tool according to claim 1, wherein said control device comprises an enable button (MB1) or activation button for activating a selected machine area (M) in the assigned operating mode such that operation is only possible when said enable button (MB1) or activation button is actuated.

7. The machine tool according to claim 1, wherein said control device acts as an operation selector switch and wherein said control device is configured to determine an access authorization of a user by determining the user authorization of an access key of the user and allows said machine tool (W) to be operated according to the authorization of the user.

8. The machine tool according to claim 1, wherein said control device comprises a safety operation selector device comprising a selection system for changing the operating mode, an access system for restricting access to said selection system, and a picking system controlling the safety-related parts of the control.

9. The machine tool according to claim 1, wherein the service mode can be activated depending on signals of a service door and an authorization of the user.

10. The machine tool according to claim 1, wherein said operating unit (B) comprises a screen for graphically representing the machine areas (M) and operating modes of the respective machine areas (M), wherein said screen, in particular, is a touch-sensitive screen and a selection of the machine areas (M) and operating modes on said screen is possible.

11. The machine tool according to claim 10, wherein feedback from said safety controller (S) is brought to said screen of said operating unit (B) and the activated machine areas (M) are graphically represented there, said graphical representation in particular comprising highlighting the activated machine areas (M).

12. The machine tool according to claim 1, wherein the operating modes comprise a service mode for the machine operator and a service mode for the machine manufacturer.

13. The machine tool according to claim 1, wherein, in order to activate the selected machine areas (M), an enable button (MB1) or activation button acting directly on said safety controller (S) must be pressed, and wherein the selection of the machine areas (M) is transmitted to said safety controller (S) via a data transmission.

14. The machine tool according to claim 1, wherein, in order to activate the operation of the machine areas (M) in the respective operating mode, an enable button (MB1) or an activation button must be pressed and an electronic key must also be in connection with said control device.

15. The machine tool according to claim 1, wherein changing the selected machine areas (M) is possible after activation of the safety mode.

16. The machine tool according to claim 1, wherein said operating unit (B), in addition to the selection of a machine area (M), also allows the selection of individual components or a plurality of components of this machine area (M) so that these components can be set as required, said components in particular being drivable components of said machine tool (W).

17. The machine tool according to claim 1, wherein the control device is configured to perform a preset coupling of different components of machine areas (M) when a machine area (M) is selected.

18. The machine tool according to claim 1, wherein said control device executes a handshake-controlled transmission method for a configurable transmission of an ID number of a transponder key used.

19. A control device for controlling a machine tool (W), saki machine tool (W) including a plurality of machine areas (M) that each have a plurality of operating modes that include at least a standard mode and a service mode, said control device comprising:
   an operating unit configured to receive user machine area (M) selections and user operation mode selections; and
   a safety controller (S) configured to control said machine areas (M);
   wherein said operating unit (B) is configured to assign user selected operating modes to user selected machine areas (M) and to transmit each user selected machine area (M) with said assigned user selected operating mode to said safety controller (S); and
   wherein said safety controller (S) is configured to control said user selected machine areas (M) based on said assigned user selected operating modes.

20. A method for controlling a machine tool (W) with a control device, said control device including a machine controller configured to control said machine tool (M) and a safety controller (S) and said machine tool (W) including a plurality of machine areas (M) that each have a plurality of different operating modes that include at least a service mode and a standard mode, said method comprising the steps of:
   accessing the system of said control device by connection to an electronic key;
   selecting operating modes;
   selecting machine areas;
   transmitting data, including the selected operating modes and machine areas, to said safety controller (S);
   controlling operation of said machine tool (W) based on said transmitted data that includes the selected operating modes and machine areas.

21. A non-transitory computer program product with program means which are stored on a data carrier and configured to be executed on a control device of a machine tool (W) in such a way that a method according to claim 20 is carried out on said machine tool (W).

* * * * *